(12) United States Patent
Vaish (10) Patent No.: US 12,311,732 B2
(45) Date of Patent: May 27, 2025

(54) ELECTRONIC SYSTEM WITH INTEGRATED ALERTING AND COOLING MECHANISMS TO SAVE THE LIFE OF AN UNATTENDED CHILD IN A VEHICLE

(71) Applicant: Anya Vaish, Kirkland, WA (US)

(72) Inventor: Anya Vaish, Kirkland, WA (US)

( * ) Notice: Subject to any disclaimer, the term of this patent is extended or adjusted under 35 U.S.C. 154(b) by 764 days.

(21) Appl. No.: 17/478,542

(22) Filed: Sep. 17, 2021

(65) Prior Publication Data

US 2023/0086707 A1    Mar. 23, 2023

(51) Int. Cl.
*B60H 1/00* (2006.01)
*B60H 1/32* (2006.01)
*B60N 2/00* (2006.01)
*G08B 21/02* (2006.01)
*G08B 21/22* (2006.01)

(52) U.S. Cl.
CPC ..... *B60H 1/00742* (2013.01); *B60H 1/00521* (2013.01); *B60H 1/32* (2013.01); *B60N 2/0024* (2023.08); *B60N 2/0033* (2023.08); *G08B 21/023* (2013.01); *G08B 21/0269* (2013.01); *G08B 21/22* (2013.01); *B60H 2001/3286* (2013.01); *B60N 2210/40* (2023.08); *B60N 2230/30* (2023.08)

(58) Field of Classification Search
CPC .. B60H 1/00721; B60H 1/00521; B60H 1/32; B60H 1/00978; B60H 2001/3286; B60N 2/002; B60N 2/5635; G08B 21/22
USPC .......................................................... 454/75
See application file for complete search history.

(56) References Cited

U.S. PATENT DOCUMENTS

| | | | |
|---|---|---|---|
| 4,939,911 A * | 7/1990 | Mandell | F25B 21/02 |
| | | | 119/500 |
| 5,793,291 A | 8/1998 | Thornton | |
| 5,949,340 A | 9/1999 | Rossi | |
| 6,535,137 B1 | 3/2003 | Ryan | |
| 6,909,365 B2 | 6/2005 | Toles | |
| 6,922,622 B2 | 7/2005 | Dulin et al. | |
| 7,320,223 B1 * | 1/2008 | Dabney | B60N 2/2845 |
| | | | 62/3.61 |
| 8,058,983 B1 * | 11/2011 | Davisson | G08B 21/24 |
| | | | 340/457 |

(Continued)

FOREIGN PATENT DOCUMENTS

| | | | | |
|---|---|---|---|---|
| CN | 113167511 A * | 7/2021 | ......... | B60H 1/00478 |
| GB | 2182183 A | 5/1987 | | |

OTHER PUBLICATIONS

Reginald Mckinnon, Pediatric Vehicular Heatstroke Report Kids in Hot Cars, 2018, p. 1-32, https://www.nsc.org/heatstroke, U.S.A.

(Continued)

*Primary Examiner* — Allen R. B. Schult (57) ABSTRACT

The invention describes a safety system for cooling air around a child in a car when an engine of the car is turned off, and a cooling mechanism of the safety system is automatically activated above a specified temperature when a child is left in the car. The safety system incorporates an audio alert, a visual alert, and a mechanism to send a distress signal or call to emergency services after two minutes after the car engine is turned off and the child is not removed from the car. An open-source Firmware code was used to control thermoelectric cooling via Arduino and an Android software code for emergency calls.

16 Claims, 6 Drawing Sheets

(56) References Cited

U.S. PATENT DOCUMENTS

| | | | |
|---|---|---|---|
| 8,063,788 B1 * | 11/2011 | Morningstar | G08B 21/24 |
| | | | 340/439 |
| 9,734,687 B1 | 8/2017 | Santiago | |
| 2003/0132838 A1 | 7/2003 | Toles | |
| 2015/0066311 A1 | 3/2015 | Schroeder | |
| 2018/0065504 A1 * | 3/2018 | Lan | B60W 10/30 |

OTHER PUBLICATIONS

Scott T. Chiesa et. al., Temperature and blood flow distribution in the human leg during passive heat stress, J. Appl Physiol, 2016, 120, 1047-105.

* cited by examiner

ELECTRONIC SYSTEM WITH INTEGRATED ALERTING AND COOLING MECHANISMS TO SAVE THE LIFE OF AN UNATTENDED CHILD IN A VEHICLE

FIELD OF THE INVENTION

The present application relates to an electronic safety system. More specifically, this invention pertains to saving the life of a child in a hot car.

BACKGROUND OF THE INVENTION

Every year, approximately 40 children in the United States die due to hyperthermia from a rise in car temperature when an inattentive parent or a caregiver accidentally leaves the child in the car. This tragedy happens due to a lapse in memory of the parent or the caregiver, often when there is a change of routine. A change in the normal routine can make even a careful parent accidentally leave a child behind in the car seat. The temperature of a closed car can increase to over 120° F. within a few minutes. When the outside temperature is 80° F., the temperature inside the car can rapidly climb to 109° F. in 20 minutes, causing a child's death due to hyperthermia. A child's body heats up three to five times faster than adults, and major organs begin to shut down when the body temperature reaches 104° F. There are currently no reliable electronic reminder and cooling systems that work independently of the car engine.

There have been attempts to integrate technology to alert inattentive parents who leave a child behind in a car or send an emergency call alert signal to rescue the child. Despite these attempts, the number of children dying in hot cars every year has not declined.

There is an urgent need to develop a smart car seat that not only alerts the parents or a rescue agency but also activates life-saving mechanisms that are sufficient to save the life of a child, left behind in a car for a sufficient time to allow the parent or the rescue agency to respond and save the child.

SUMMARY OF THE INVENTION

The invention described here is an electronic safety system for cooling air around a child in a car when an engine of a car is turned off comprising: a pressure sensing device configured to sense the child by the child's weight, a cooling device, an electrical system configured to carry a signal, from the pressure sensing device sensing the child, to activate the cooling device, a system battery, connected to the electrical system, configured to provide power to the safety system, and a power relay and a diode connected in series and connecting the system battery to a car battery, wherein the Relay and the diode ensure that the system battery provides power to the safety system when the car engine is turned off.

In one embodiment, the system battery is connected via the power relay and the diode to a power plug which is connected to the car battery via an electrical outlet of the car, wherein voltage of the system battery is from 2.0V to 12.0V, and the electrical outlet of the car provides 2.0 Amps to 10.0 Amps of power output.

In another embodiment, the system battery is a rechargeable battery.

In one embodiment, the cooling device is selected from a group consisting of a thermoelectric cooler (TEC), a Peltier device, a water evaporation cooler, an electrical fan, a cooling device configured to circulate cold water in a mesh of microtubes, a portable air conditioning system, and a combination thereof.

In one embodiment, the cooling device is the TEC and, when operational, has a hot surface and a cool surface, wherein the hot surface is in physical contact with a heatsink which is connected to a fan and the cool surface is in physical contact with a fast cooling tank, wherein the opposite surface of the fast cooling tank is in physical contact with a heat storage main tank.

In one embodiment, wherein the fast cooling tank is in fluid communication with a pump, the pump is in fluid communication with a radiator with a fan, the radiator is in fluid communication with the heat storage main tank, and the main tank is in fluid communication with the fast cooling tank, wherein, the pump is configured to pump cold water, a cold liquid, or cold air from the fast cooling tank to the radiator, to the main tank, and then back to the fast cooling tank in a closed circulation system.

In one embodiment, the radiator is configured to exchange heat with the cold water or the cold air in the closed circulation system and the fan is configured to draw cool air from or push the cool air through the radiator and blow the cool air on the child's head, face, thighs, a combination thereof, or entire body.

In another embodiment, the cooling device is connected to a thermometer via the electrical system, the thermometer configured to measure the temperature of the inside of the car.

In one embodiment, the cooling device is configured to be activated when the thermometer measures a temperature above 77° F. or measures a temperature between 76° F. to 130° F. or measures a temperature between 55° F. to 77° F., wherein the cooling device is further configured to blow the cool air on the child via the radiator fan or via an air duct connected to the radiator fan.

In another embodiment, wherein the system is configured to help regulate the air temperature around the child for more than one hour, more than four hours, more than 12 hours, or more than 24 hours to increase chances of survival while help arrives.

Optionally, the electrical system is connected to a key fob via a radio transmitter, wherein the key fob is configured to sound an alarm when the pressure sensing device senses the presence of the child and the distance between the child car seat and the key fob exceeds over 10 feet when the car engine is turned off or when the pressure sensing device senses the presence of the child for more than 2 minutes after the car engine is turned off.

In one embodiment, the safety system is incorporated in a child car seat, wherein the pressure sensing device is configured to be placed under the child, the vehicle comprises a trunk, and the cooling device and the system battery are configured to be placed in the trunk of the vehicle. The term vehicle means a car, truck, van, or any automobile.

Optionally, the invention further comprises one or more electrical fans connected to the electrical system and attached to the child car seat configured to blow air on the child's head, face, thighs, a combination thereof, or the entire body.

In one embodiment, the electrical system is connected to a smartphone via a global positioning system (GPS) system, wherein the smartphone is configured to send an emergency call or 911 call to an emergency service after the pressure sensing device senses the presence of the child in the car for 2 minutes, or wherein the smartphone is configured to sound an audio alarm when the distance between the child car seat and the smartphone exceeds over 10 feet when the car engine is turned off or after the pressure sensing device senses the presence of the child in the car for 2 minutes.

In another embodiment, the GPS is configured to allow the emergency service to locate and retrieve the child from the car.

In one embodiment, the electrical system is connected to a visual alert configured to turn on or flash when the car engine is turned off and the child is in the car, wherein the visual alert is placed on the car's dashboard or on the child car seat.

In another embodiment, the invention further comprises an audio alert system integrated into the safety system and configured to sound an alarm when the car engine is turned off and the pressure sensing device senses the presence of the child.

Optionally, a motion sensor is integrated in the electrical system, wherein the motion sensor senses the presence of the child or a living being or an animal by its motion in the car.

The invention described here provides a method for saving life of a child left unattended in a car comprising: (a) providing a safety system for cooling air around a child in a car when an engine of a car is turned off comprising: a pressure sensing device configured to sense the child by the child's weight, a cooling device, an electrical system configured to carry a signal, from the pressure sensing device sensing the child, to activate the cooling device, a system battery, connected to the electrical system, configured to provide power to the safety system, and a power relay and a diode connected in series and connecting the system battery to a car battery, wherein the Relay and the diode ensure that the system battery provides power to the safety system when the car engine is turned off, (b) providing a child car seat with, a global positioning system (GPS) connected to the electrical system, a cell phone connected the safety system wirelessly, a thermometer connected to the electrical system configured to measure the temperature of the interior of the car, (c) sensing that the child is in the car seat after the car engine is turned off, (d) turning on the cooling device when the car reaches a temperature above 76° F. as measure by the thermometer, and (e) placing a call using the cell phone to an emergency service and providing the location of the child two minutes after the car engine is turned off.

Various other objects, features, and advantages of the invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

It is to be understood that the invention is not limited in its application to the details of the particular arrangement shown since the invention is capable of other embodiments. In addition, the terminology used herein is for the purpose of description and not of limitation.

DETAILED DESCRIPTION

In view of the great need to prevent hyperthermia in children left in hot cars, the systems, methods, and apparatus described herein provide the avenues to keep the air temperature around a child in the car near 77 degrees Fahrenheit for over an hour or up to ten hours to prevent hot car deaths, along with technical features, benefits, and advantages below described for the various aspects and embodiments summarized below.

The present invention relates generally to saving the life of a child in a hot car. The term child means any living being, including a baby, a child, an adult, or an animal found in the car. More specifically, the present invention relates to apparatus, systems, and methods for saving the life of a child accidentally left in the car due to hyperthermia. The invention involves a safety system (an electronic safety system) that reminds parents, passersby, and emergency services that a child is in the backseat of the car. The safety system incorporates a cooling mechanism to regulate the air temperature around the child in the car seat for a specified time and incorporates an electronic system and mechanism that gives visual and audible alerts and sends an emergency call with GPS (Global Positioning System) location to alert an emergency service that a child has been left in the car unattended. The safety system can be used alone or incorporated in a child car seat, creating a smart car seat.

The smart car seat, designed and described here, will provide electronic reminders that a child is left behind in the car seat 2 minutes after the car engine is turned off, will send a distress signal to emergency services, and will automatically activate cooling mechanisms to maintain a comfortable temperature around the child to avoid death by hyperthermia. The cooling will be achieved by an Arduino-controlled thermoelectric cooling system or other cooling systems described below, attached with the child's car seat that will maintain ambient temperature around the child. Experiments demonstrated the activation of audio, visual, emergency call, and cooling systems when a 1-100 pound weight simulating the weight of a child was left in the car seat and the car engine was turned off. The system described here will be useful in preventing the death of a child accidentally left in the car due to hyperthermia.

An ideal system will be a smart child car seat with an embedded electronic system that (a) incorporates audio and visual reminders for parents, (b) sends a distress call to emergency services, such as police, ambulance, and fire station, within two minutes if there is no response from the parent or caregiver, (c) employs a temperature sensor to measure the air temperature around the child, (d) employs a pressure sensor (a pressure pad) to determine whether the child is in the seat when the car engine is turned off, (e) employs a cooling system with an independent power system from the car power, and (f) turns on automatically when the car engine is off, and child is still in the seat and maintains a comfortable air temperature (ambient temperature) around the child until help arrives preferably more than one hour, more than four hours, more than twelve hours, more than 24 hours, or longer.

Figure 1:
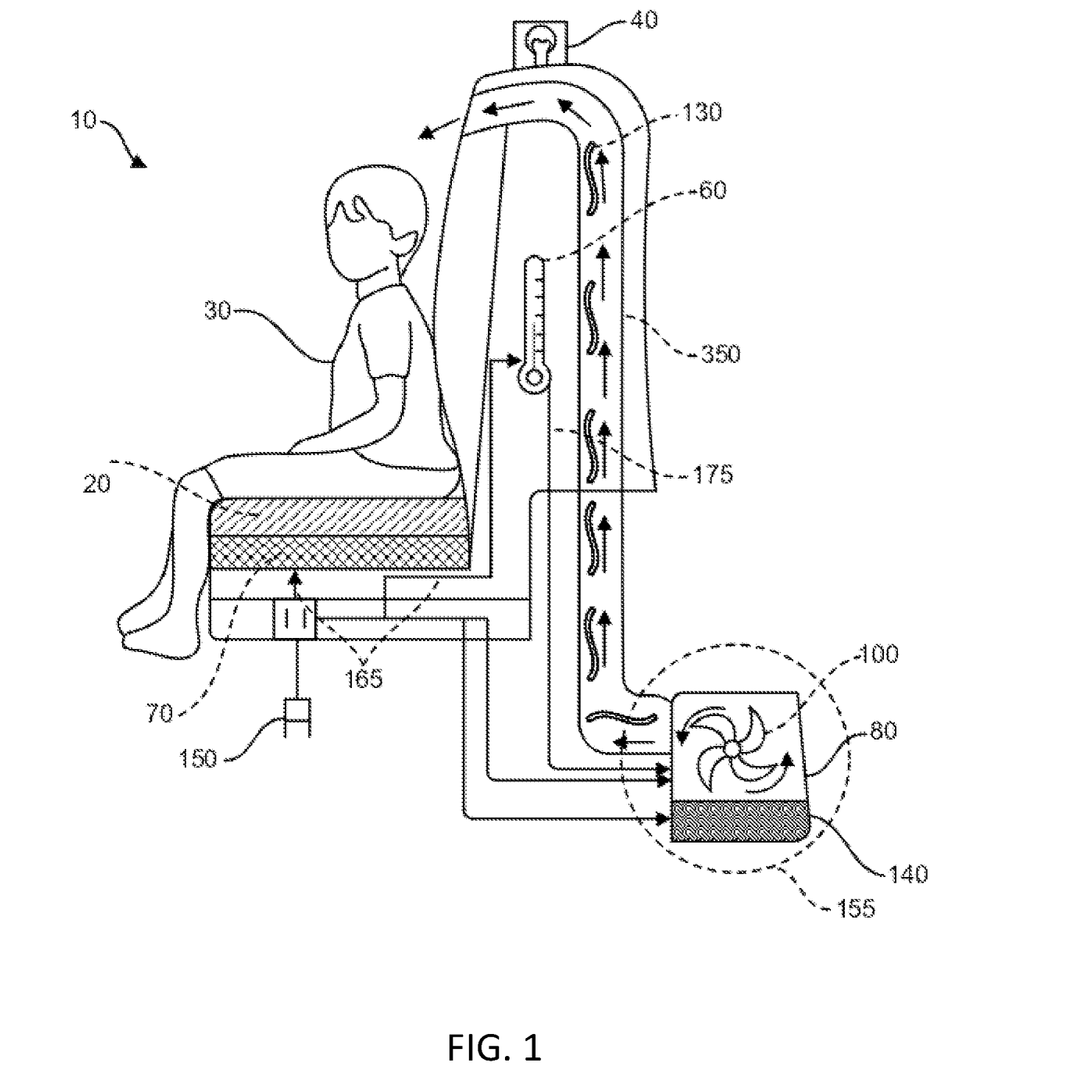
FIG. 1: A representative schematic of the smart car seat 10.

FIG. 1 depicts a schematic of a smart car seat 10 with integrated cooling and alerting electronic systems. The electronic system is designed to operate independently of the car seat or can be incorporated in any car seat. In this scheme, a weight or pressure sensor (pressure pad) 20 is placed under the cushion of the car seat to detect the presence of a child 30 by its weight. A visual light indicator 40 is prominently displayed on the car seat. An audio alert device 50 (not shown) (see FIG. 2) is also provided. Both visual light and audio signals are connected to the system battery in a manner that when the car engine is turned off and the pressure sensor senses a weight, the indicator light and audio alarm are turned on instantly. A temperature sensor (probe) or a digital thermometer 60 is placed in a convenient location to measure the air temperature around the child, allowing the system software to activate the cooling system above 76° F. (or a set temperature ranging from 55° F. to 130° F.) and shut down the cooling system below 76° F. A Bluetooth transceiver device 70 is placed in a convenient location in the car seat, which is configured to pair with a cell phone via Bluetooth up to a 10 feet radius. Beyond 10 feet radius from the Bluetooth transceiver device 70, the cell phone will sound an audio alert. The Bluetooth transceiver device 70 also acts as a GPS receiver and is configured to use the cell phone to send a distress call to emergency services providing GPS coordinates. Even if the Bluetooth transceiver is delinked from the cell phone, an Android application software program in the cell phone will send the distress signal after two minutes. One skilled in the art would understand that the Bluetooth transceiver 70 could be configured to connect to the parent's cell phone via either Bluetooth or via a satellite. After the electric circuit is completed by the weight of the child and turning off the car engine, GPS receiver 70 in the electronic system 170 of the car seat kicks on the software program in the parent's cell phone, which starts a clock for two minutes. If the program is not terminated by either picking up the child or switching off the power of the system by the provided power switch 240 (FIG. 2), the parent's cell phone will call 911. Optionally, a dedicated pager system or another phone can be paired with the transceiver device 70 and kept with the car seat that can send the distress call to emergency services in the absence of the parent's cell phone. Optionally, the transceiver device 70 can be a pager system or a phone.

Figure 2:
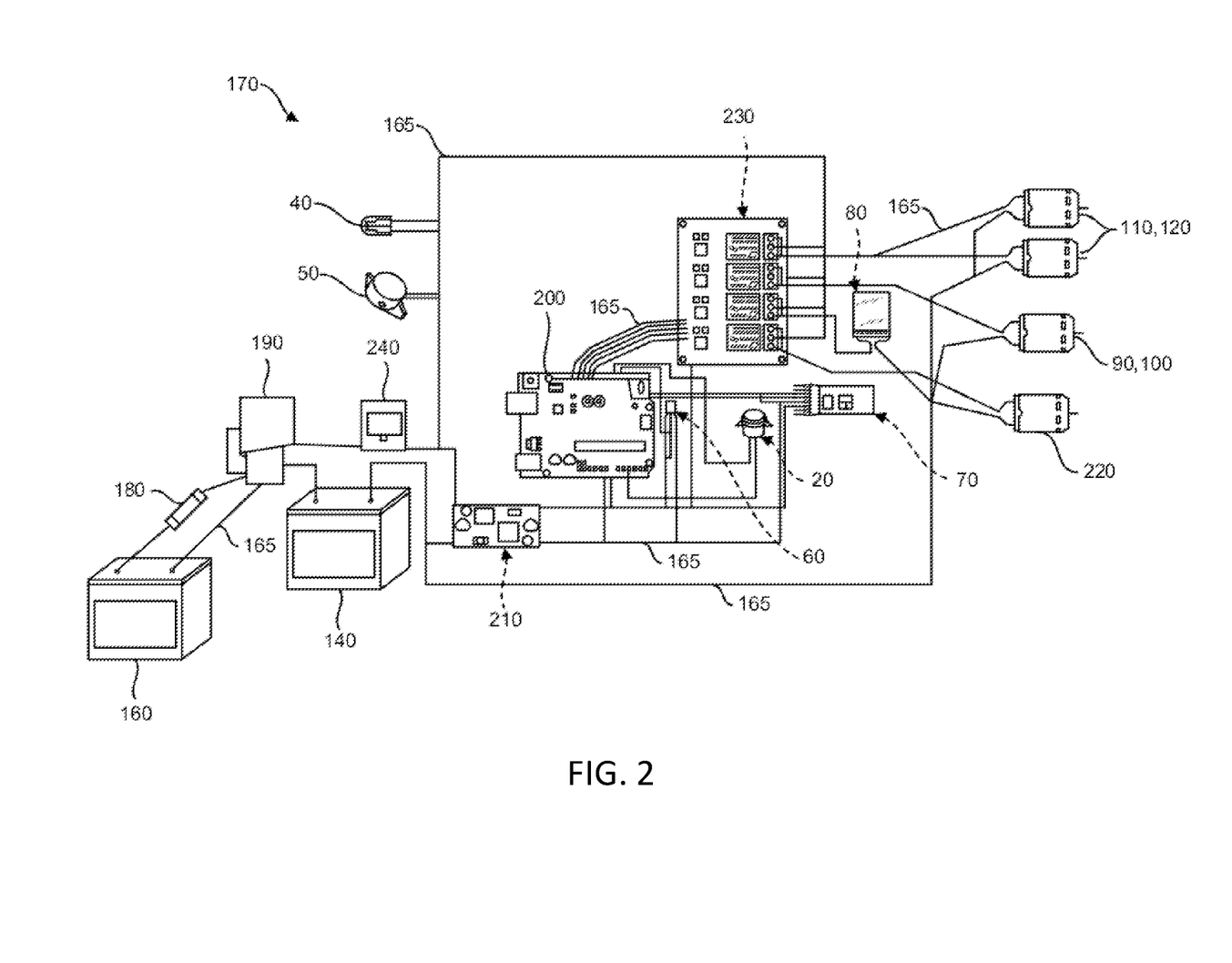
FIG. 2: The electronic system 170 of the smart child car seat 10. The system is connected to the car battery 160 via a car power outlet and connected via a diode 180 and a relay power 190.

A thermoelectric cooling device 80 (thermoelectric cooler or Peltier device) is provided with an attached heatsink 90 (not shown) (see FIG. 4) with a fan 100 to dissipate heat and a fan 110 (not shown) with radiator 120 (not shown) (see FIG. 4) to push the cool air 130 toward the child. The cold water or air from the cooling device can be transferred either directly to the child via a pump and silicon tubes or by using closed-loop cold water or air circulation system with a 5V fan(s) with a heat exchanger placed near the head or thighs of the child, and the water or air circulated back to the cooling surface of the thermoelectric cooler for reuse (see FIG. 4). A rechargeable lead-acid or lithium-ion battery (system battery) 140 is provided to power the electronic system 170 (FIG. 2). The electronic system 170 is connected using a power plug 150 to the car battery 160 via a car power outlet to charge the system battery 140 when the child is in the car seat; thereby, the system battery is not providing power to the safety system. A feedback loop 175 between the thermometer 60 and the thermoelectric cooler 80 is designed to start the cooling at or above 76° F. when the child's presence is recorded, and the car engine is turned off. The thermoelectric cooling device 80 and the system battery 140 are configured to be placed in the trunk 155 of the car, separate from the passenger compartment, for efficient cooling of air around the child and for safety. Placing the thermoelectric cooler device in the trunk will increase the cooling efficiency of the system by dissipating the built-up heat away from the passenger compartment. Optionally, heat from the trunk can be actively dissipated out of the trunk by actively blowing hot air using a fan via tubes having openings to the outside environment. By placing the battery in the trunk of the car, the accidental injury by the battery can be minimized. The rechargeable battery and the cooling device (the thermoelectric cooler (TEC)) can also be positioned in the back of the car seat as an integral part of the car seat. The pressure sensor, the thermometer, the transceiver device, the system battery, the thermoelectric cooler, the fans, etc., are connected to each other via electric wiring 165.

As shown in FIG. 1, the invention is a smart car seat 10 for keeping the air temperature around the child in the car seat near 77° F. for a period to prevent death due to hyperthermia before emergency services can retrieve the child. The invention is also designed to give parents a reminder via cell phone, a key fob, an audio alert 50 (FIG. 2), or a visual signal 40 (FIG. 2) so they do not accidentally leave the child in the car seat, in addition to providing a 911 or emergency call along with GPS positioning of the child in the car seat to emergency services to respond, locate and recover the child from the vehicle.

A pressure sensor 20 is configured to be placed under the cushions of the smart car seat. When the child is placed in the seat, the device senses the presence of the child by his or her weight on the pressure sensor. This activates an electronic circuit 170 (FIG. 2), which wirelessly connects to the key fob or smartphone of the parent or a caregiver. The pressure on the pressure sensor also turns on a visual alert 40 placed on the car's dashboard or on the car seat to show that the child is in the car seat. The visual indicator 40 is connected to the electronic system of the smart car seat either directly by a wire or wirelessly. The device senses when the engine of the car turns off through the car's electrical system because the car's electrical system is only turned on when the car's engine is on. When the car's engine is turned off, the visual indicator 40 on the child car seat and/or on the dashboard starts to flash, and an audio 50 (FIG. 2) alert is turned on to remind the caregiver that the child is in the car.

In the event the parent or a caregiver exits the car without retrieving the child and the engine of the car is turned off, the wireless connection with the key fob or the smartphone comes into play. Once the distance between the car seat and either the key fob or the smartphone exceeds over 10 feet, an alarm sounds in the key fob or the smartphone alerts the caregiver. Upon turning off the car engine, a timer starts, giving 2 to 10 minutes for the caregiver to respond and take the child out of the car. If no action has been taken by the time the timer to retrieve the child has run out, the system automatically places an emergency or 911 call using the parent's cell phone and sends the location of the child through the GPS tracker 70 (FIG. 2) attached to the car seat 10 to an emergency response team. One skilled in the art would understand that the GPS tracker 70 could be configured to connect to the parent's cell phone via either Bluetooth or via a satellite.

In a preferred embodiment, by the time any response by the emergency service is taken to recover the child, there is a threat for severe hyperthermia to the child by increased temperature in the car. To delay any effect of hyperthermia, a cooling mechanism is incorporated in the smart car seat or provided connected to the car seat. The cooling mechanism can be a portable water evaporation cooler, a thermoelectric cooler (TEC) device such as a Peltier cooling device with a fan to blow cool air, or thermoelectric Peltier cooling plates placed under the cushions of the car seat to cool the cushions touching the child's legs, bottom, and the back. The cooling can adjust for humidity. The cooling device can be pads that will be able to cool down the child's body temperature by circulating cold water (or other cooling liquid in a closed system) through microtubes. Other examples of such cooling devices are a chiliPAD™ cooling system, an IceBox™, or a portable air conditioning system. The cooling device can be any other system such as carbon dioxide or other gas under pressure that results in a cooling effect when the gas is released or any other endothermic chemical reactions. An example of an endothermic reaction is the reaction between ammonium thiocyanate and barium hydroxide octahydrate.

A rechargeable lead-acid battery or a lithium-ion battery 140 is incorporated to power fans 110, cooling devices (TEC) 80, send a call to emergency services such as 911, send the radio signal to key fob to sound an alarm, send a signal to a phone or a smartphone, power audio 50 (FIG. 2) or visual 40 devices provided on or with the child car seat.

Optionally, the pads with the heating coils can also be incorporated into the system to provide warmth to the child if the child is suffering from hypothermia when the air temperature drops below 70° F.

In one embodiment, in addition to or in alternative to a cooling system, one or more small fans can be incorporated within the child car seat near the child's head or legs that will be activated to blow air on the child's scalp, face, thighs, any body parts, or whole body to lower the body temperature.

The invention described here can help regulate the child's body temperature for over one hour, up to twelve hours, up to twenty-four hours, or up to five days so that help can arrive to retrieve the child and save the child's life.

Materials needed to build one such system are described as follows: Arduino Uno 5V 16 MHz was used for the main logic circuit design. KOOLASON DC12V Thermoelectric electronic Peltier refrigerator was used for closed system advanced cooling. A 6 cell relay module with an optocoupler was used for 5V turning fans and cooling systems. LM2596 DC-DC Adjustable Buck Converter Module 4.0~40V to 1.25~37V Power Supply Transformer with LED Display, CenryKay was used to step down 12V power from a battery to 5V power to operate the Arduino Uno logic board. Flexible Soft Food Grade Silicone Hose Tube Pipes were used to connect various system parts to create a closed air or water circulation system for heat transfer. Spring Band Fuel Hose Clips Silicone Pipe Clamps were used to secure pipelines. A ML7-12 VOLT 7.2 AH SLA, Mighty Max Battery was used to supply power to the system. A 12V micro self-absorbent water pump was used to circulate cold air or fluid. A DS1820 stainless steel waterproof temperature probe was used for temperature measurement. A HCO5 Bluetooth Transceiver Module 2.4G, RF Wireless Industrial was used to connect the system with a cell phone and used as a GPS (Global positioning system) receiver. A 1 KG load cell pressure plate was used to sense the presence of a simulated child by the child's weight. An aluminum heat exchanger radiator with fan, DC12V 80 mm, Clyxgs was used to dissipate the heat from the hot surface of a thermoelectric Peltier cooler. A DC 12V 30CM Soft Fexible 15 SMD 3528 Blue Strip Lights, VizGiz was used to indicate the presence of a child. A 5-Pin 12V Bosch Style Waterproof Relay was used to connect the system battery to the vehicle battery power. A Rectifier Diode, 10A 1000V R-6 Axial Electronic Silicon Diode, MCIGICM was used to connect the Relay to the vehicle battery to ensure that the current flows in only one direction. Safer Soldering Iron Kit Welding Tool, 60 W, Adjustable Temperature Soldering Iron with ON/OFF Switch, Soldering Iron Tips, Ambberdr was used for soldering electrical connections. A temperature sensor probe—Plug and Play Temperature Controller, model ITC-308 from Inkbird Tech, USA was used to measure the temperature. A smartphone was used to run the application code to operate the system and to test the emergency call system. A different cell phone was used instead of emergency services phone number to receive the emergency call. The safety system was tested in a car.

Software—Codes:

A Firmware code (Firmware software) for Arduino and a Software code (Android application software) were developed using two open-source developing tools. The Arduino Integrated Development Environment (IDE) (https://www.arduino.cc/en/software) is a cross-platform application that is written in functions from C and C++. IDE application is used to write and upload programs to Arduino compatible boards. The MIT Application Inventor (http://appinventor.mit.edu/) is a web application integrated development environment originally provided by Google, and now maintained by the Massachusetts Institute of Technology, U.S.A. The MIT Application Inventor is used to develop Android application software. The MIT Application Inventor can be used to develop iOS application software for non-Android devices.

Arduino Integrated Development Environment (IDE): The Arduino IDE is used to write and upload programs to Arduino compatible boards, but also, with the help of third-party codes, other vendor development boards. The Firmware code uses a temperature reading from a probe to determine a need to activate cooling. After cooling is activated, counting starts to see how much time was spent on cooling. As time increases, the cooling power increases. To preserve power, the time interval for cooling can be adjusted.

MIT Application Inventor: The Android software is build using a blocks editor and is installed in a cell phone with an Android operating system. The software checks the presence of Bluetooth in 911 mode and reads the temperature of the probe. The software incorporates a code for a text-to-speech function that sends a message to the emergency services after the start of two minutes clock. The text-to-speech message informs the coordinates of the location after dialing 911 if the child is not retrieved within 2 minutes (or a set timeframe). To disable the alarm and 911, a physical switch is used to turn off the system power, or a QR Tag at the car seat is scanned to turn off the alarm. Geo-location system from the phone is used in GPS (Global Positioning System) and GPRS (General Packet Radio Service) mode to pinpoint the location.

Figure 4:
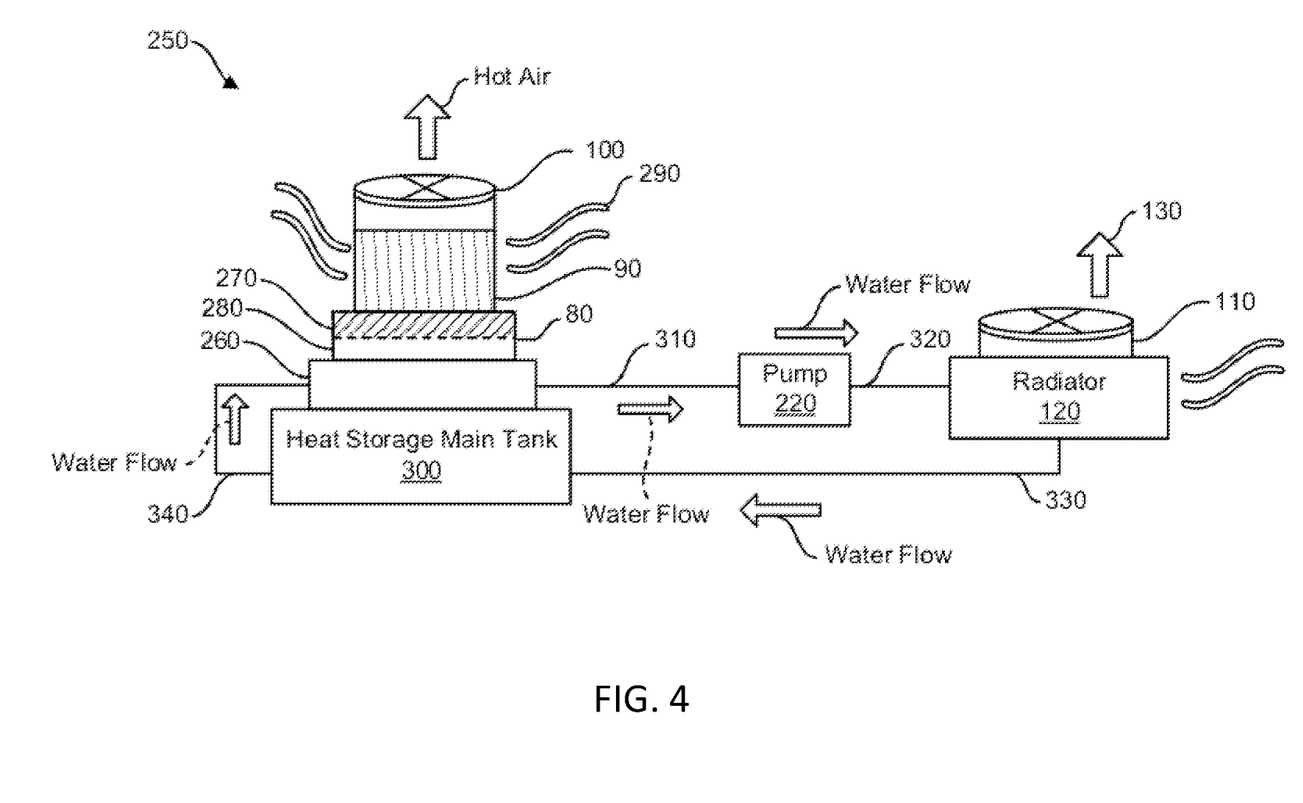
FIG. 4: A water, liquid, or air flow diagram to transfer heat or cold from the thermoelectric cooler (TEC) 80.

FIG. 2 depicts the electronic system 170 of the smart child car seat 10. The 12V system battery 140 is connected to the car battery 160 via a car power outlet and connected via a diode 180 and a relay power 190. The diode and relay power ensure that when the car engine is on, the system remains off, and when the car engine is turned off, the system is turned on. When not in use, the lead-acid system battery 140 is constantly charged using car power when the engine is on. The main logic Arduino Uno board 200 is connected to the system battery 140 via a DC-DC convertor 210 to step down the power from 12V to 5V. The Main logic Arduino Uno board 200 is directly connected to and controls functions of the temperature sensor 60, the pressure sensor 20, and the Bluetooth transceiver device 70. The Bluetooth transceiver device 70 functions as GPS receiver 70 and sends distress calls using the Android application software installed in a cell phone to emergency services. The Arduino Uno 200 controls functions of the thermoelectric cooler (TEC) 80, the main fan 100 (a heatsink 90 with a fan 100 to dissipate the heat generated from the hot surface of the TEC 80), the pump 220 (to circulate cold air or liquid from the TEC to heat exchanger fans 110 with a radiator 120 via a 12V 6 cell relay 230 which is directly connected to the system battery 140. The visual indicator 40 and the audio alarm 50 are directly connected to the system battery 140 and turn on as soon as the car engine is turned off. The pressure sensor 20 detects the presence of a simulated child. A switch 240 is provided to manually turn the power of the system off and on.

the car using a fan and tube with an outlet outside the vehicle. The fast cooling tank 260, opposite to the cool surface of the TEC, touches a heat storage main tank 300 that contains water, a high specific heat capacity liquid, or air. A pump 220 transfers the cold water from the fast cooling tank 260 to a radiator 120 which is coupled to a 5V fan 110. The radiator and the fan transfer the cold as a cool air 130 which is blown by the fan over the child or a specific body part of the child such as head, face, thigh, or whole body. The water from the radiator then goes into the main tank, from where the water travels back to the fast cooling tank to carry cold from the cold surface of the TEC to the radiator. The fast cooling tank, the main tank, the heat sink, and the radiator are made from aluminum or a metal such as copper, iron, silver, or gold, etc. but not limited to these metals.

Table 1 summarizes the steps of the functioning of the invention.

TABLE 1

Steps summarizing the functions of the invention.

1. Plug the safety system 170 incorporated within a child car seat into a car power outlet that provides power only when the car engine is turned on.
2. Place a child (or a weight) 30 that weighs from 1 pound to 100 pounds in the car seat.
3. Turn on the car engine.
   a. The safety system battery 140 is charging, and the safety system 170 is not powered.
4. Turn off the car engine while the child is in the car seat.
   a. The safety system battery 140 is not charging in this mode; instead, the system battery now provides power to the safety system, turning the system on.
   b. Powering on the safety system turns on audio alarm 50 and visual indicator 40.
   c. The system detects pressure on the pressure sensor 20.
   d. The Android software in the parent's cell phone starts a two minute time clock. When the two minutes time runs out, the system sends a distress call (911 call) to emergency services and provides the coordinates of the child via a text-to-speech function using the GPS locator in the safety system.
   e. If the cell phone moves more than 10 feet from the safety system or delinks the system's Bluetooth, the cell phone sounds an audio alert.
   f. When the system records air temperature by temperature sensor 60 near the system above a predefined temperature, such as 76° F., the Firmware code starts the cooling process, which continues until the temperature drops below 76° F. The process repeats when the temperature rises again above 76° F. The cooling process entails the pump 220 operation to circulate cool air or liquid in a closed system and operation of fans 100, 110.
5. When the child is removed from the car seat, the electronic circuit breaks due to loss of pressure on the pressure sensor 20 or by physically turning off the electrical system by using the switch 240.

Figure 3:
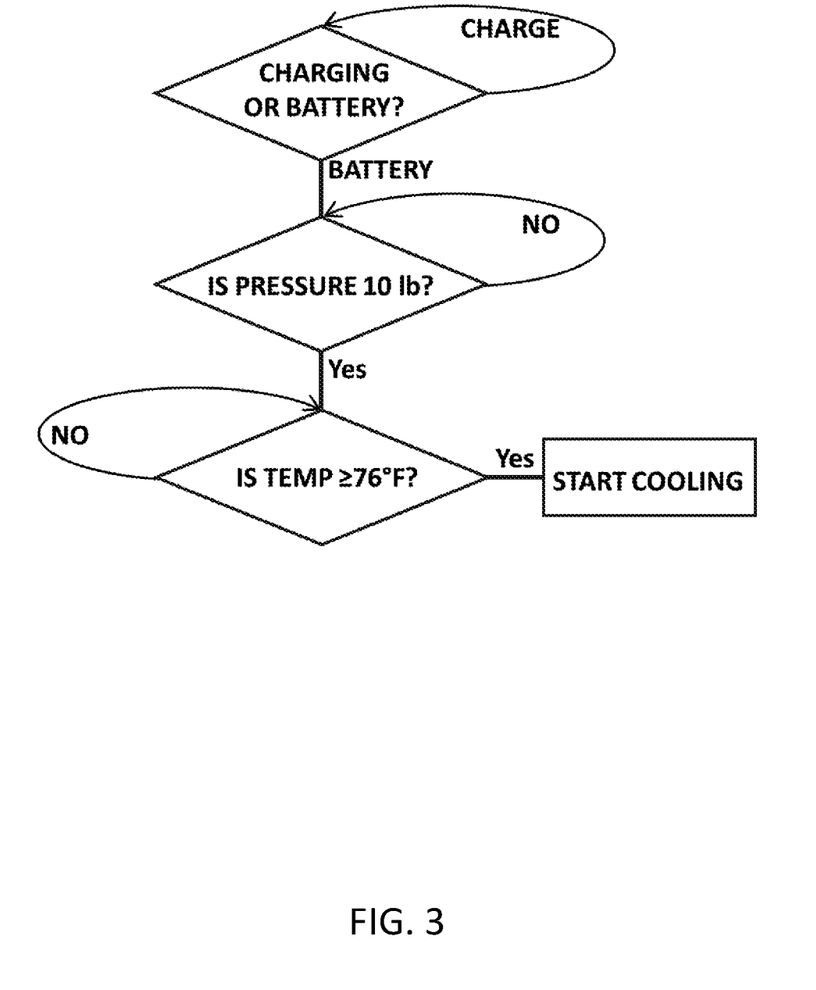
FIG. 3: The logic diagram of the cooling system.

FIG. 3 depicts the logic diagram of the cooling process. The figure indicates that when the car engine is on, the battery of the electronic system 80 of the smart car seat is charging, and the system 170 is not powered, and the seat does not detect the presence of a weight (a child). When the car engine is turned off and the child is still in the smart car seat, the system 170 is powered on, and the battery 140 is not charging. In this mode, the system detects the pressure of the weight, and when the air temperature is ≥76° F., the thermoelectric cooler (TEC) (cooling device) 80 of the system starts the cooling process.

FIG. 4 depicts a water, liquid, or air flow diagram whereby the thermoelectric cooler (TEC) 80 is sandwiched between a heat sink 90 and a fast cooling tank 260. The hot surface 270 of the thermoelectric cooler 80 touches the heat sink 90, and the cold surface 280 touches the fast cooling tank 260. The heat sink is coupled with a 5V fan 100 and dissipates heat 290 from the hot surface 270 of the TEC 80. The hot air can be dissipated in the trunk of the vehicle, as shown in FIG. 1, or the hot air can be actively blown out of Examples The Arduino UNO microcontroller system was used along with a thermoelectric cooling device and 5V fans incorporated in the child car seat for controlling and cooling the air around a simulated child. The system was tested in a car on a normal day. The car heating system was used to simulate a hot car interior and control the temperature of the car interior. Different components of the system were tested in separate tests. The first is the audio and visual alert systems, the second is the temperature control system, and the third is the emergency alert system. A 10-lb weight was used to simulate a child left behind in the car. A weight ranging from 1 to 100 pounds can be used to simulate the child.

Powering of the system by the system battery, which was continuously charged using the car battery, was tested by placing a 10-lb weight simulating a child left behind in the car and turning off the car engine. The indicator lights and an audio alarm attached to the electronic system of the child car seat were immediately turned on as soon as the system power was turned on upon sensing a simulated child in the car seat.

The Android software is written to incorporate a two minute lag time to send the distress (911) call after the car engine power is turned off and the system senses the presence of the simulated child. The event of powering on the system, upon turning off the car engine, started a clock for two minutes allowing time for the caregiver to retrieve the child before sending the distress (911) call to the emergency responders. To avoid any inadvertent phone call to police and/or emergency responders, a personal cell phone was used to confirm that the system would send an emergency call. The system provided the location of the distress call, indicating a child in the car seat using GPS 70 and the parent's phone.

When a 1 to 50-lb weight simulating a child was left behind in the car in the child car seat connected to a power outlet of the car and the car engine was off, the system was automatically turned on using power from the system battery 140, which was continuously charged using the car battery 160. The indicator lights 40 attached to the child car seat were immediately turned on as soon as the system power was turned on upon sensing a simulated child in the car seat. The event of powering on the system started a clock for two minutes allowing time for the caregiver to retrieve the child before sending a distress (911) call to the emergency responders. The system can be configured to allow less than one minute to more than 10 minutes for the caregiver to retrieve the child from the child car seat. Experiments confirmed that the system would send an emergency call using a personal cell phone to avoid any inadvertent phone call to police and/or emergency responders. The system provided the location of the distress call, indicating a child in the car seat using GPS 70 and the parent's phone.

Table 2 shows the results of the testing of the system components. When a 10-lb weight was in the car seat and the car engine was on, the visual and audio alerts were off. The system did not send a distress call, and the cooling system did not turn on. When the car engine was turned off with a 10-lb weight in the car seat, the visual and audio alerts immediately turned on. The two minutes clock started, and after two minutes, when the weight was not removed from the seat, the system sent an emergency call with GPS coordinates to a cell phone, which was used to avoid a 911 emergency call. The system's cooling system was turned on as soon as the air temperature rose to 77° F.

TABLE 2

Results of the functional testing of the system components

| Dependent Variables | Independent Variables | |
| --- | --- | --- |
|  | Car engine on | Car engine off |
| Visual alert | ✗ | ✓ |
| Audio alert | ✗ | ✓ |
| Distress call and voice message with GPS coordinates after 2 minutes. | ✗ | ✓ |
| The cooling system turned on when the temperature inside the car was ≥77° F. | ✗ | ✓ |

The ability of the system's cooling mechanism being turned on was tested when the car engine is turned off. Using a weight simulating the child, the system (the child car seat containing the electrical system with thermoelectric cooling device) was placed on the back car seat. The system was plugged into the car electrical port, and the car engine was turned on. When the engine was on, the system remained off. When the car temperature was 76° F. and the car engine was turned off, the system indicator lights 40 and sound alarm 50 were turned on, but the fans 100, 110 and the thermoelectric cooling device 80 were not turned on. When the air temperature rose above 77° F. (or above a specified temperature, for example, 76° F.) and the car engine was turned off, all of the indicator lights 40, the sound alarm 50, the fans 100, 110, the thermoelectric cooling device 80, and the water circulation pump 220 were turned on. The fans, the water pump, and the thermoelectric cooling device continued to operate until the air temperature was equal to or greater than 77° F. As soon as the air temperature dropped below 77° F., the fans, the water pump, and the thermoelectric cooling device were turned off as programmed in the software.

The system maintained the air temperature around the child near ambient temperature. The system also sent an emergency call to a cell phone. The cooling system did not let the temperature drop below the ambient temperature of 77° F.

Figure 5:
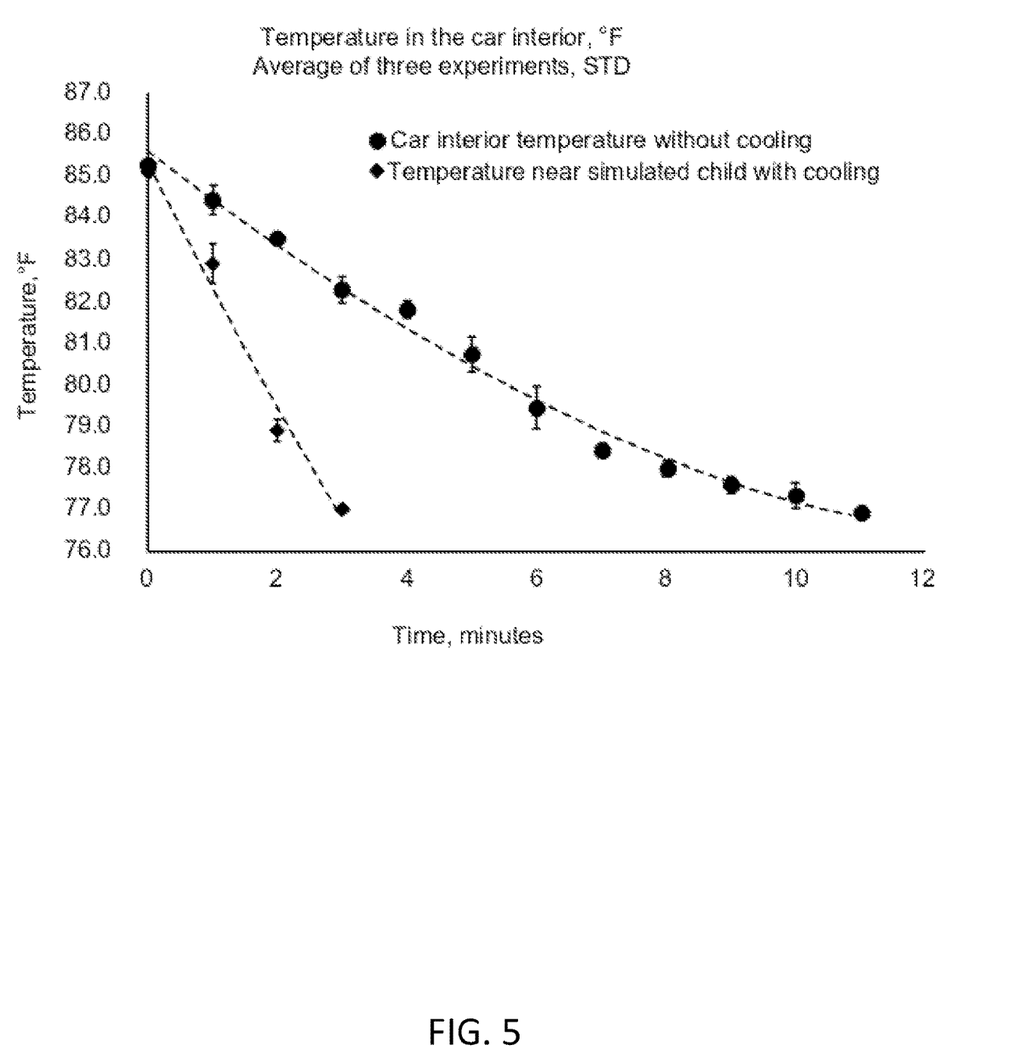
FIG. 5: The results of an experiment showing that the smart car seat effectively cools the air near a simulated child.

FIG. 5 depicts the results of an experiment when the car interior was heated to 85° F. using car heating and the engine was turned off. The car interior was naturally cooled to 77° F. in twelve minutes. When the smart car seat cooling was automatically turned on after car heating was turned off, the local temperature near the simulated child was lowered to 77° F. within 3 minutes. The experiment was repeated two times, and the average of three temperature readings was plotted against time. The results indicate that the thermoelectric cooler efficiently cooled the temperature around the simulated child to 77° F.

Figure 6:
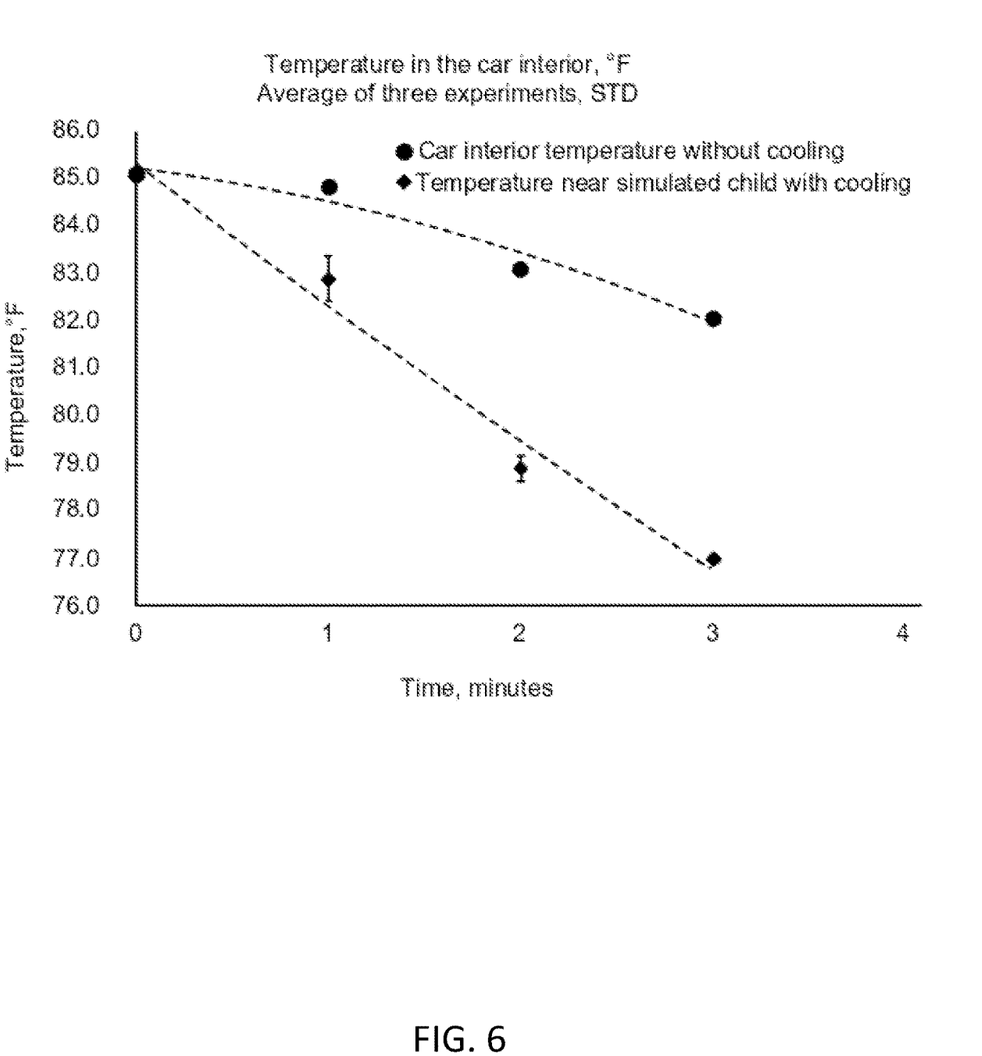
FIG. 6: The results of an experiment when the smart car seat cooling was automatically turned on after car heating was turned off, showing differential cooling near the child car seat and the front seat of the car by a thermoelectric cooler.

FIG. 6 depicts the results of an experiment when the smart car seat cooling was automatically turned on after car heating was turned off. The local temperature near the simulated child was dropped to 77° F. within 3 minutes. The air temperature near the front car seat was dropped to only 82° F. within 3 minutes. The experiment was repeated two times, and the average of three temperature readings was plotted against time. The results indicate efficient cooling by the thermoelectric cooler around the simulated child.

The invention described here is a smart car seat with an embedded cooling mechanism that has the potential to save the life of a child accidentally left in the car by a caregiver. The smart car seat is designed to turn on the smart car seat's system power using an independent battery power as soon as the pressure sensor detects the presence of a child or a weight of more than 2-pounds in the car seat and the car engine is turned off. The system allows a parent to retrieve the child within two minutes of turning off the engine. If the child is not retrieved within two minutes, the system is designed to call emergency services using the parent's cell phone. More than two minutes lag time is not provided because a car's interior could heat up by 20° F. within 10 minutes, putting the child at risk. The system is designed to maintain an ambient temperature (77° F.) around the child. The lead-acid battery used in the current system lasted for more than four hours when the cooling system was continuously operated. Depending on the car interior temperature and auto-shut-off feature of the cooling system, the batteries could last more than four hours.

The invention described here employed a 12V Mighty Max Battery that could provide power for cooling up to four hours in moderate conditions. However, the cooling power and cooling time can be extended to operate for more than a day by using a more powerful battery and a more powerful TEC or by connecting additional TECs in parallel. The current system uses a lead-acid battery; however, a lithium-ion battery or any portable power source can also be used instead of the lead-acid battery.

While preferred embodiments of the present invention have been shown and described here, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will not occur to those skilled in the art without departing from the invention. It shall be understood that all aspects of the invention are not limited to the specific depictions, configurations, or relative proportions set forth herein, which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A safety system for cooling air around a child in a car when an engine of a car is turned off comprising: a pressure sensing device configured to sense the child by the child's weight, a cooling device, an electrical system configured to carry a signal, from the pressure sensing device sensing the child, to activate the cooling device, a system battery, connected to the electrical system, configured to provide power to the safety system, and a power relay and a diode connected in series and connecting the system battery to a car battery, wherein the power relay and the diode ensure that the system battery provides power to the safety system when the car engine is turned off, wherein the electrical system is connected to a key fob via a radio transmitter, wherein the key fob is configured to sound an alarm when the pressure sensing device senses the presence of the child and the distance between the child car seat and the key fob exceeds over 10 feet when the car engine is turned off or when the pressure sensing device senses the presence of the child for more than 2 minutes after the car engine is turned off, wherein the safety system is incorporated in a child car seat, wherein the pressure sensing device is configured to be placed under the child, the car comprises a trunk, and the cooling device and the system battery are configured to be placed in the trunk of the car, and wherein the electrical system is connected to a smartphone via a global positioning system (GPS) system, wherein the smartphone is configured to send an emergency call or 911 call to an emergency service after the pressure sensing device senses the presence of the child in the car for 2 minutes, or wherein the smartphone is configured to sound an audio alarm when the distance between the child car seat and the smartphone exceeds over 10 feet when the car engine is turned off or after the pressure sensing device senses the presence of the child in the car for 2 minutes.

2. The system of claim 1, wherein the system battery is connected via the power relay and the diode to a power plug which is connected to the car battery via an electrical outlet of the car, wherein a voltage of the system battery is from 2.0V to 12.0V, and the electrical outlet of the car provides a 2.0 Amps to 10.0 Amps of power output.

3. The system of claim 1, wherein the system battery is a rechargeable battery.

4. The system of claim 1, wherein the cooling device is selected from a group consisting of a thermoelectric cooler (TEC), a Peltier device, a water evaporation cooler, an electrical fan, a cooling device configured to circulate cold water in a mess of microtubes, and a portable air conditioning system.

5. The system of claim 4, wherein the cooling device is the TEC and when operational has a hot surface and a cool surface, wherein the hot surface is in physical contact with a heatsink which is connected to a fan and the cool surface is in physical contact with a fast cooling tank, wherein the opposite surface of the fast cooling tank is in physical contact with a heat storage main tank.

6. The system of claim 5, wherein the fast cooling tank is in fluid communication with a pump, the pump is in fluid communication with a radiator with a fan, the radiator is in fluid communication with the heat storage main tank, and the main tank is in fluid communication with the fast cooling tank, wherein, the pump is configured to pump cold water, a cold liquid, or cold air from the fast cooling tank to the radiator, to the main tank, and then back to the fast cooling tank in a closed circulation system.

7. The system of claim 6, wherein the radiator is configured to exchange heat with the cold water or the cold air in the closed circulation system and the radiator fan is configured to draw cool air from or push the cool air through the radiator and blow the cool air on the child's head, face, thighs, a combination thereof, or entire body.

8. The system of claim 7, wherein the cooling device is connected to a thermometer via the electrical system, the thermometer configured to measure the temperature of an inside of the car.

9. The system of claim 8, wherein the cooling device is configured to be activated when the thermometer measures a temperature above 77° F. or measures a temperature between 76° F. to 130° F. or measures a temperature between 55° F. to 76° F., wherein the cooling device is further configured to blow the cool air on the child via the radiator fan or via an air duct connected to the radiator fan.

10. The system of claim 9, wherein the system is configured to help regulate the air temperature around the child for more than one hour, more than four hours, more than 12 hours, or more than 24 hours to increase chances of survival while help arrives.

11. The system of claim 1, further comprising one or more electrical fans connected to the electrical system and attached to the child car seat configured to blow air on the child's head, face, thighs, a combination thereof, or the entire body.

12. The system of claim 1, wherein the GPS is configured to allow the emergency service to locate and retrieve the child from the car.

13. The system of claim 1, wherein the electrical system is connected to a visual alert configured to turn on or flash when the car engine is turned off and the child is in the car, wherein the visual alert is placed on the car's dashboard or on the child car seat.

14. The system of claim 1, further comprising an audio alert system integrated into the safety system and configured to sound an alarm when the car engine is turned off and the pressure sensing device senses the presence of the child.

15. The system of claim 1, wherein a motion sensor is integrated in the electrical system, wherein the motion sensor senses the presence of the child or a living being by its motion in the car.

16. A method for saving life of a child left unattended in a car comprising:
(a) providing a safety system for cooling air around a child in a car when an engine of a car is turned off comprising: a pressure sensing device configured to sense the child by the child's weight, a cooling device, an electrical system configured to carry a signal, from the pressure sensing device sensing the child, to activate the cooling device, a system battery, connected to the electrical system, configured to provide power to the safety system, and a power relay and a diode connected in series and connecting the system battery to a car battery, wherein the power relay and the diode ensure that the system battery provides power to the safety system when the car engine is turned off, (b) providing a child car seat with, a global positioning system (GPS) connected to the electrical system, a cell phone connected the safety system wirelessly, a thermometer connected to the electrical system configured to measure the temperature of the interior of the car, (c) sensing that the child is in the car seat after the car engine is turned off, (d) turning on the cooling device when the car reaches a temperature above 76° F. as measured by the thermometer, and (e) placing a call using the cell phone to an emergency service and providing the location of the child two minutes after the car engine is turned off,
wherein the electrical system is connected to a key fob via a radio transmitter, wherein the key fob is configured to sound an alarm when the pressure sensing device senses the presence of the child and the distance between the child car seat and the key fob exceeds over 10 feet when the car engine is turned off or when the pressure sensing device senses the presence of the child for more than 2 minutes after the car engine is turned off.

* * * * *